US007305622B2

(12) United States Patent
Cohen et al.

(10) Patent No.: US 7,305,622 B2
(45) Date of Patent: Dec. 4, 2007

(54) GRAPHICAL USER INTERFACE AND WEB SITE EVALUATION TOOL FOR CUSTOMIZING WEB SITES

(75) Inventors: Tal Cohen, Tucker, GA (US); Nissim Harel, Tucker, GA (US); Dean Frederick Jerding, Roswell, GA (US); David Dagon, Atlanta, GA (US)

(73) Assignee: Clickfox, LLC, Atlanta, GA (US)

( * ) Notice: Subject to any disclaimer, the term of this patent is extended or adjusted under 35 U.S.C. 154(b) by 276 days.

(21) Appl. No.: 10/005,182

(22) Filed: Dec. 5, 2001

(65) Prior Publication Data

US 2002/0089532 A1 Jul. 11, 2002

Related U.S. Application Data

(60) Provisional application No. 60/251,487, filed on Dec. 5, 2000.

(51) Int. Cl.
*G06F 3/00* (2006.01)
*G06F 9/00* (2006.01)
*G06F 17/00* (2006.01)

(52) U.S. Cl. .................. 715/736; 715/734; 715/737

(58) Field of Classification Search ................ 345/734, 345/736, 737, 738; 709/223, 224; 715/736, 715/737, 738
See application file for complete search history.

(56) References Cited

U.S. PATENT DOCUMENTS

| | | | |
|---|---|---|---|
| 5,220,655 A | 6/1993 | Tsutsui | |
| 5,717,923 A | 2/1998 | Dedrick | |
| 5,727,129 A | 3/1998 | Barrett et al. | |
| 5,878,384 A | 3/1999 | Johnson et al. | |
| 5,948,061 A | 9/1999 | Merriman et al. | |
| 5,958,008 A * | 9/1999 | Pogrebisky et al. | ........ 709/223 |
| 5,960,409 A | 9/1999 | Wexler | |
| 6,006,197 A | 12/1999 | d'Eon et al. | |

(Continued)

FOREIGN PATENT DOCUMENTS

WO  PCT/US99/18282    2/2000

OTHER PUBLICATIONS

Ref A. www.rswsoftware.com/index.html May 8, 1999.*

(Continued)

*Primary Examiner*—Kristine Kincaid
*Assistant Examiner*—Boris Pesin
(74) *Attorney, Agent, or Firm*—Troutman Sanders LLP; James E. Schutz

(57) ABSTRACT

An invention for displaying patterns of utilization of a resource wherein the resource includes a plurality of correlated or uncorrelated objects. The method consists of providing a number of graphical formats from which a format is selected for display of patterns of utilization. Additionally, a query is submitted regarding a particular utilization of the resource. Along with the selected format and query inputs, the invention receives information regarding utilization of the resource from a system. Once the invention receives the inputs and the utilization information from the system, the invention processes the information to a format that conforms with the inputs. The invention then displays the processed information in the selected graphical format. The invention also allows the selection of a second graphical format from the graphical formats for altering the display to show the processed information in the second selected format.

28 Claims, 17 Drawing Sheets

U.S. PATENT DOCUMENTS

| | | | |
|---|---|---|---|
| 6,014,638 A | 1/2000 | Burge et al. | |
| 6,021,439 A | 2/2000 | Turek et al. | |
| 6,044,376 A | 3/2000 | Kurtzman, II | |
| 6,052,730 A | 4/2000 | Felciano et al. | |
| 6,055,510 A | 4/2000 | Henrick et al. | |
| 6,064,381 A * | 5/2000 | Harel | 715/705 |
| 6,088,722 A | 7/2000 | Herz et al. | |
| 6,112,238 A | 8/2000 | Boyd et al. | |
| 6,112,240 A | 8/2000 | Pogue et al. | |
| 6,300,947 B1 | 10/2001 | Kanevsky | |
| 6,353,822 B1 | 3/2002 | Lieberman | |
| 6,401,118 B1 | 6/2002 | Thomas | |
| 6,448,980 B1 | 9/2002 | Kumar et al. | |
| 6,463,455 B1 | 10/2002 | Turner et al. | |
| 6,549,944 B1 * | 4/2003 | Weinberg et al. | 709/224 |
| 6,564,170 B2 | 5/2003 | Halabieh | |
| 6,574,793 B1 | 6/2003 | Ngo et al. | |
| 6,589,291 B1 * | 7/2003 | Boag et al. | 715/513 |
| 6,598,077 B2 * | 7/2003 | Primak et al. | 709/219 |
| 6,606,581 B1 | 8/2003 | Nickerson et al. | |
| 6,615,247 B1 | 9/2003 | Murphy | |
| 6,658,415 B1 | 12/2003 | Brown et al. | |
| 6,665,715 B1 * | 12/2003 | Houri | 709/223 |
| 6,763,334 B1 | 7/2004 | Matsumoto et al. | |
| 6,934,748 B1 * | 8/2005 | Louviere et al. | 709/224 |
| 2002/0147805 A1 * | 10/2002 | Leshem et al. | 709/223 |

OTHER PUBLICATIONS

Ref B www.rswsoftware.com/index.html Dec. 2, 2000.*

Ref C "E-Test Suite-The Fastest Way to Test the Quality, Scalability, and Availability of Web Applications".*

R. Cooley et al., Grouping Web Page References into Transactions for Mining World Wide Web Browsing Patterns, Knowledge and Data Engineering Exchange Workshop, Nov. 4, 1997.

* cited by examiner

GRAPHICAL USER INTERFACE AND WEB SITE EVALUATION TOOL FOR CUSTOMIZING WEB SITES

RELATION TO OTHER APPLICATIONS

This application claims the priority of United States provisional patent application having Ser. No. 60/251,487 and filed on Dec. 5, 2000, which is also incorporated herein and attached as Appendix A.

TECHNICAL FIELD

This invention relates to automated web site evaluation and customization and, more particularly to providing a method for displaying patterns of utilization of a web site, or other similar resource, containing objects and displaying such patterns in graphical formats.

BACKGROUND OF THE INVENTION

The world wide web has exploded with new web sites. Today, most businesses want their product advertisements to reach the world market rather than the limited audience available before the Internet was invented. A web site does not succeed, regardless of how many potential customers visit the web site, if it does not retain the attention of those potential customers. Even more important than the initial attraction, however, is the ability for the web site to be constructed in a way that makes the customer want to stay and access more products, images, and items that the web site owner wishes the visitor to access during their visit. If the web site is not constructed in a manner to allow or entice the visitor to access the objects of interest, the visitor may quickly become impatient and move to an alternate source for the objects of interest. Thus, there exists a need in the art for a tool that will evaluate a visitor's activity on the web site and implement or offer solutions to modify the web site. Such modification suggestions should allow the web site to become more efficient and easier to use for visitors. This efficient and ease of use would likely entice the visitors to make their user session longer and purchase more products. Unlike a physical store that a customer may visit, which has the entrance and exit pre-designed, and that may somewhat control the visitor's actions, a web site may be exited at any time, and often is, if the web site visitor is frustrated at the complexity of navigating the objects of interest. Generally web pages within a web site are uncorrelated in that there is often no causal relationship between such pages, and thus, no manner to study visitor behavior.

Currently there are systems in the market that allow web site managers to review the utilization of their web sites and determine statistical information regarding such utilization. The available products that deliver such review ability, however, are limited to providing raw data regarding such utilization (e.g., the number of visitors per web page) or providing information on the actions that various visitors perform on a web site for review. While the current methods may allow a user to review particular sequences of activity, the current presentations of utilization information do not provide a user with information on the behaviors of the visitors or patterns that exist in the use of a web site.

Therefore, despite the efforts of the prior art, there is still a need for a method that allows web designers to view patterns in visitor behavior concerning web sites and visitor utilization of web sites wherein the web pages in such a web site are essentially uncorrelated to one another.

SUMMARY OF THE INVENTION

The above objectives are accomplished according to the present invention by providing a method for displaying patterns of utilization of a resource wherein the resource may include a plurality of correlated and uncorrelated objects. The method consists of providing a number of graphical formats from which a format is selected for display of patterns of utilization. Additionally, a query is submitted regarding a particular utilization of the resource. Along with the selected format and query inputs, the invention receives information regarding utilization of objects from a system. Once the invention receives the inputs and the utilization information from the system, the invention processes the information to a format that conforms with the inputs. The invention then displays the processed information in the selected graphical format. The invention also allows the selection of a second graphical format from the graphical formats for altering the display to show the processed information in the second selected format.

The present invention is a unique, software system that enables companies to continuously optimize the business effectiveness of their web channel by making better use of their available visitor and site data. The present invention combines the capabilities of site traffic analysis tools with user experience solutions to deliver a single, comprehensive web marketing effectiveness solution.

The present invention is unique in the way it transforms data generated directly from real users' clicks on the website into clear indicators of visitor behavior for the marketer and website manager alike. The core of the present invention's differentiation rests in its ability to analyze and process web log data, which captures the sequence of pages that each visitor visits in the web site, in the context of the site structure. Other traffic analysis tools rely only on the log file data and leave out the information describing the structure and arrangement of specific web pages, frames or virtual pages. Thus, competing tools can do little more than report hits, page views, and viewing times in tabular format. Examples of such static reports are shown below.

The present invention can generate automatic actionable site improvement recommendations based upon the analysis of log files that it provides. Thus, users can take immediate actions to change the site structure, link pages differently or remove unnecessary content based upon the present invention's ability to translate visitors' clicks into recommended actions.

Another differentiating feature is the User Task. This functionality enables software users to evaluate how visitors are performing against specific scenarios, (e.g., completing a purchase order) and what they should fine-tune in the site to increase the success rate of those visitor scenarios. Most importantly, users will understand instantly what they can do about it by following simple, easy-to-understand recommendations to ensure that the site delivers its intended results.

The present invention's unique features rest in its core "brain" that brings together visitor behavior data in the form of log files and site structure at the data modeling level. This unique technology analyzes the impact of the website structure on the user experience, compares it to the anticipated user experience, and provides recommendations on site improvement. These recommendations allow web owners to find quickly an optimal match between their own business objectives for the site or segment of the site and the needs and wants of the users. The result is that users can understand in a glance where visitors are getting turned off, what they are finding interesting and why.

This combined analytic approach enables the present invention to create a completely new market space for web analysis tools. Other clickstream tool providers generate different ways to display and analyze actual visitor data. However, because they are not able to model visitor log data with site structure data, they cannot display visually what the actual behavior looks like, point to what caused the observed behavior, nor can they generate statistically sound recommendations for creating a site experience that better matches real site user behavior.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DETAILED DESCRIPTION

Figure 1:
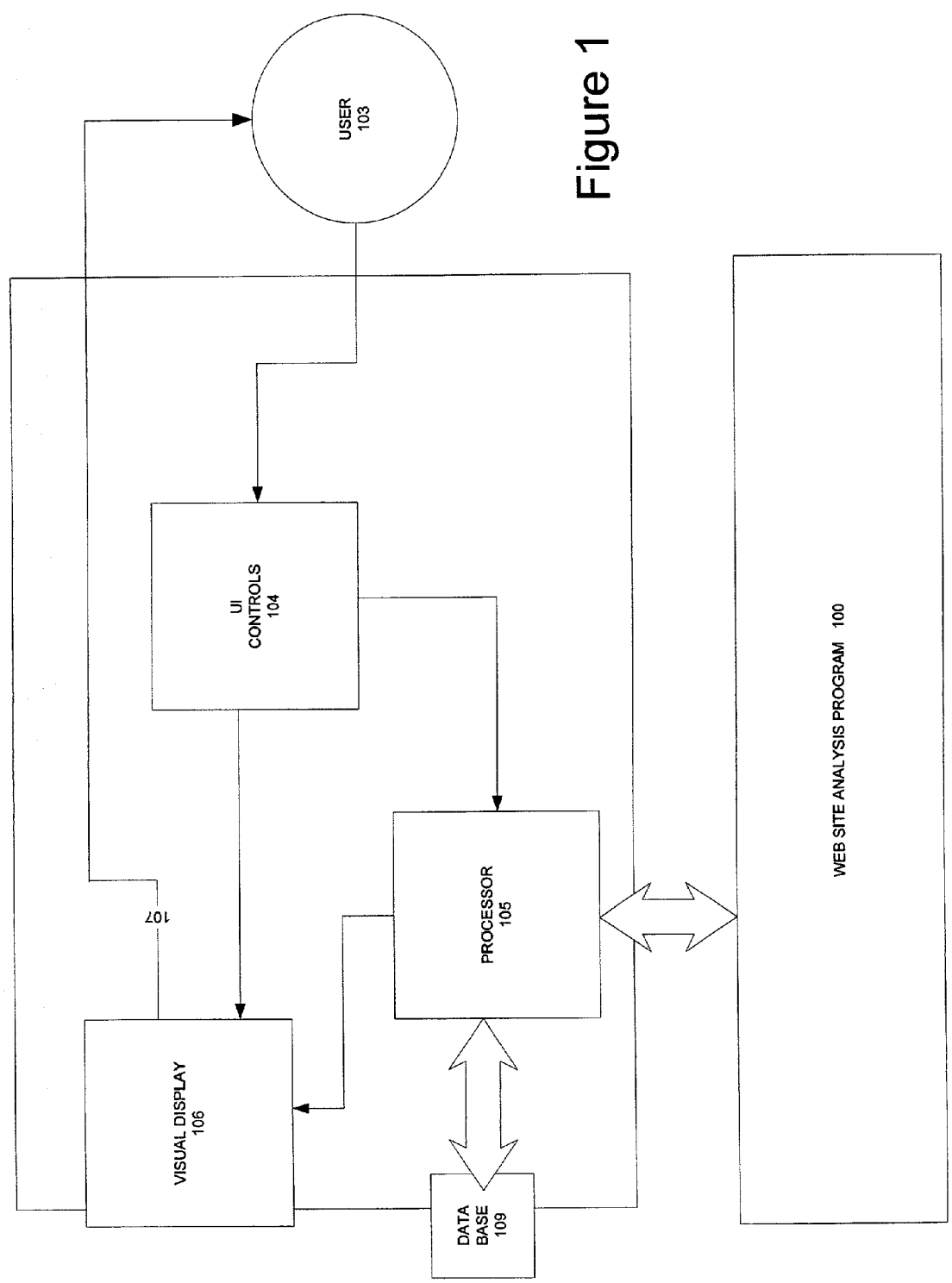
FIG. 1 is a block diagram illustrating a typical environment suitable for utilizing the present invention.

Referring now to the drawings, wherein like numerals refer to like parts throughout the several views, the invention will now be described in more detail. In general, the present invention receives structural and utilization analysis input, as well as specific control input, and uses this input to generate a graphical representation of the utilization of particular resources. More specifically, the present invention may be implemented within a graphically based web site analysis tool. In this embodiment, the structural analysis input includes structural information regarding the interrelation of links between various pages within the web site. The utilization analysis input includes activities that occur by one or multiple entities accessing and traversing through the pages of the web site. This type of information can be generated by a variety of web site analysis tools, activity logs, and other mechanisms that are readily available in the industry. Furthermore, in a particular embodiment of the present invention, the specific control input can be graphical display selections, queries regarding particular resources or web pages within the web site, queries regarding particular paths or other statistical procedures that may be conducted or invoked concerning a web site. Based, at least on these inputs, this embodiment of the present invention operates to generate a graphical representation that clearly delineates the requested information. One advantage of the present invention is that a simplified graphical interface is provided that clearly indicates patterns in web site utilization.

FIG. 1 is a block diagram illustrating a typical environment suitable for utilizing the present invention. A User or some other entity 103 provides input through User Interface Controls ("UI Controls") 104 for a query regarding the pattern of a particular utilization of a web site consisting of two or more web pages.

Figure 3:
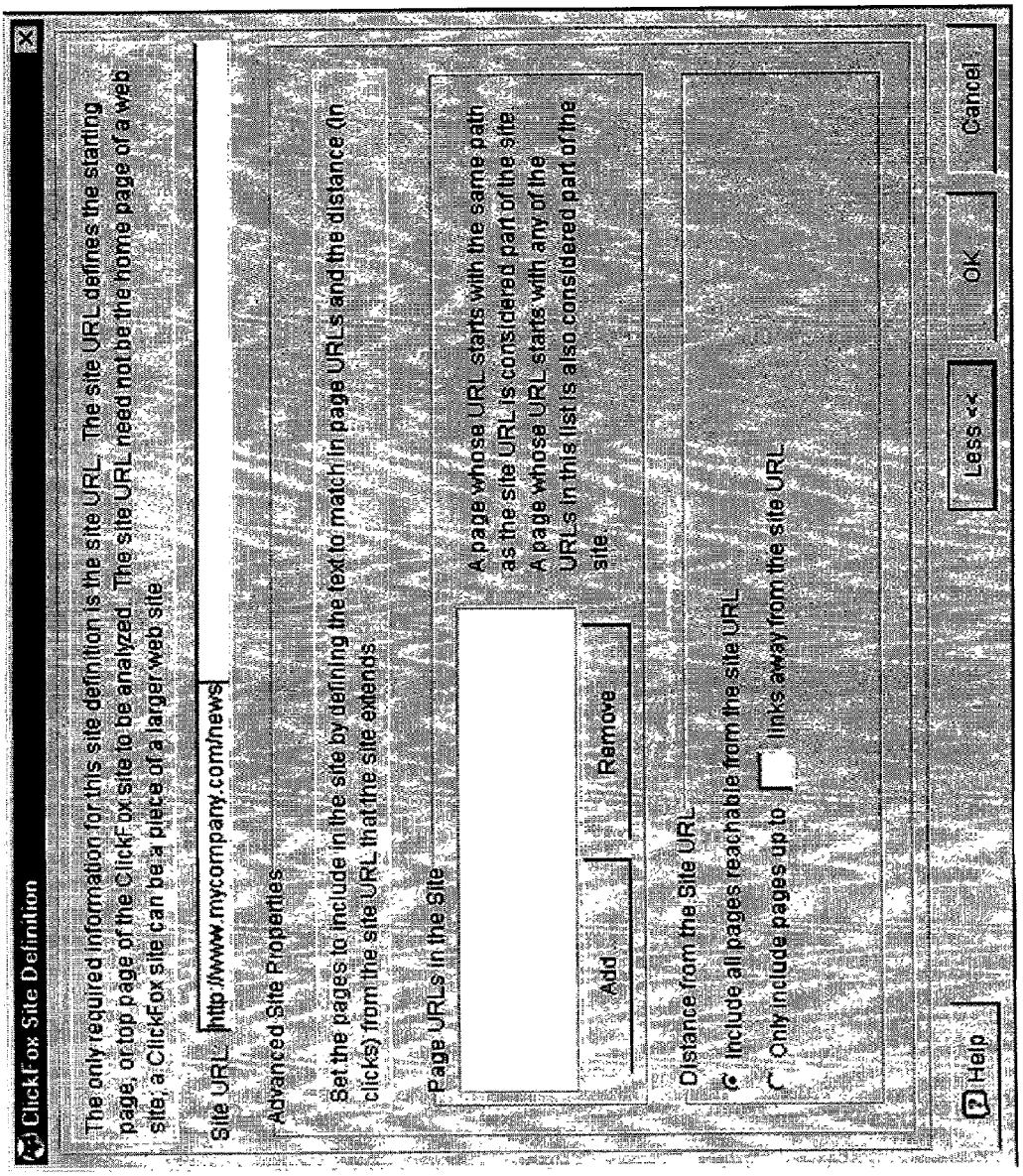
FIGS. 3-17 are web screen shots illustrating the operation and display of embodiments of the present invention in evaluating patterns of a website.

The web site may be defined in a variety of ways. One example of defining the web site, as shown in FIG. 3, is to allow for the providing of URLs of the web pages within the site. Those skilled in the art will understand that there are numerous other such ways in limiting the scope of analysis.

Several types of queries concerning web sites can be provided and the present invention is not limited to any particular query. Examples of such queries are provided simply for clarification and do not limit the present invention. One such example is a query to determine particular patterns that occur in invoking a particular function. For instance, a web site designed as a sales channel for an array of products will typically have a "purchase function". If the operator of the web site is interested in determining the patterns or steps that are followed for visitors that utilize the web site to purchase a particular product, the query may identify the product of interest and the purchase function. The present invention operates to determine the various patterns, steps, web page traversals, etc. that the various visitors of the web site follow in fulfilling the purchase of the product. Another example of a query may be a request of the statistical information concerning the number of visitors that visit each web page within the web site.

Figure 4:
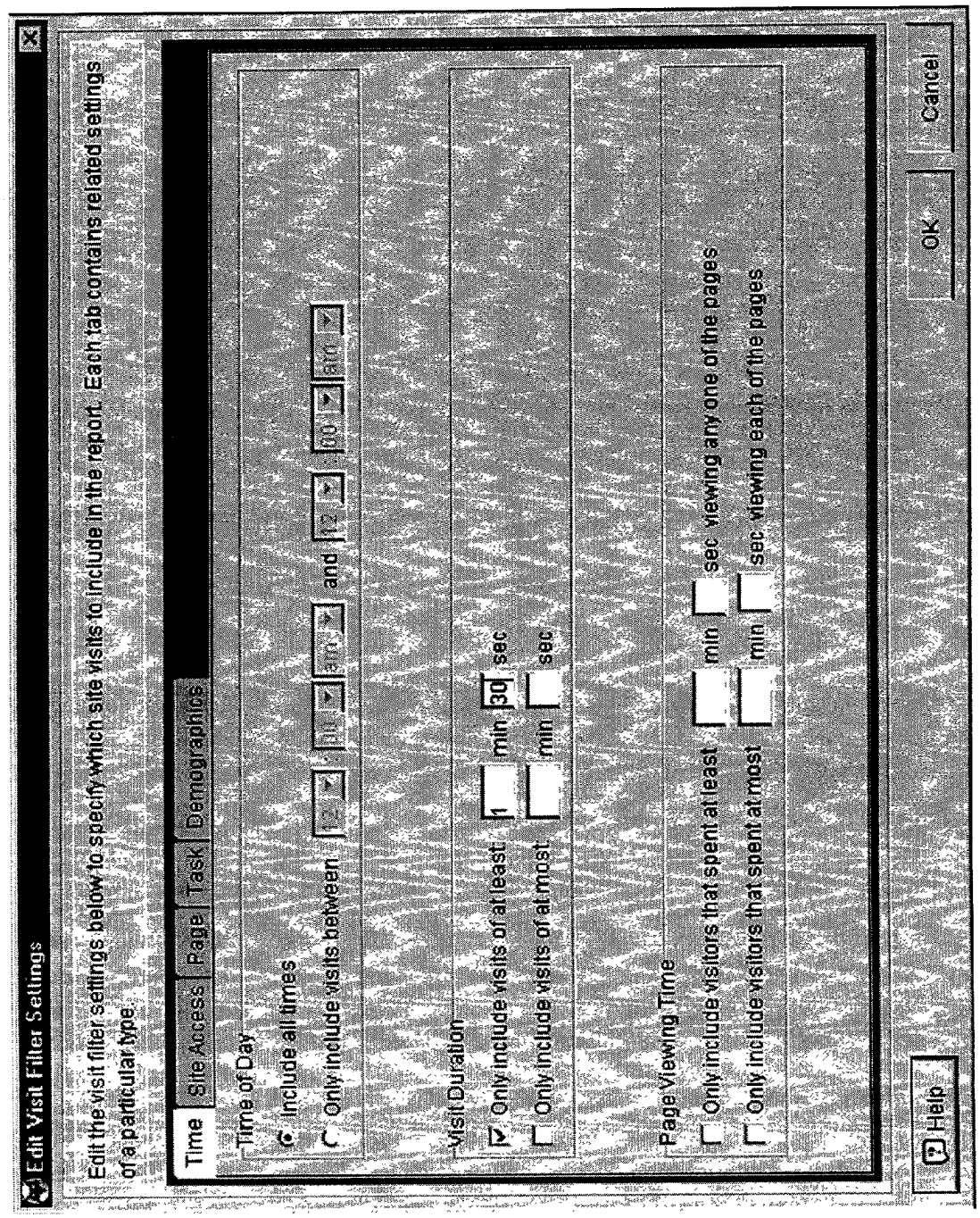
Figure 5:
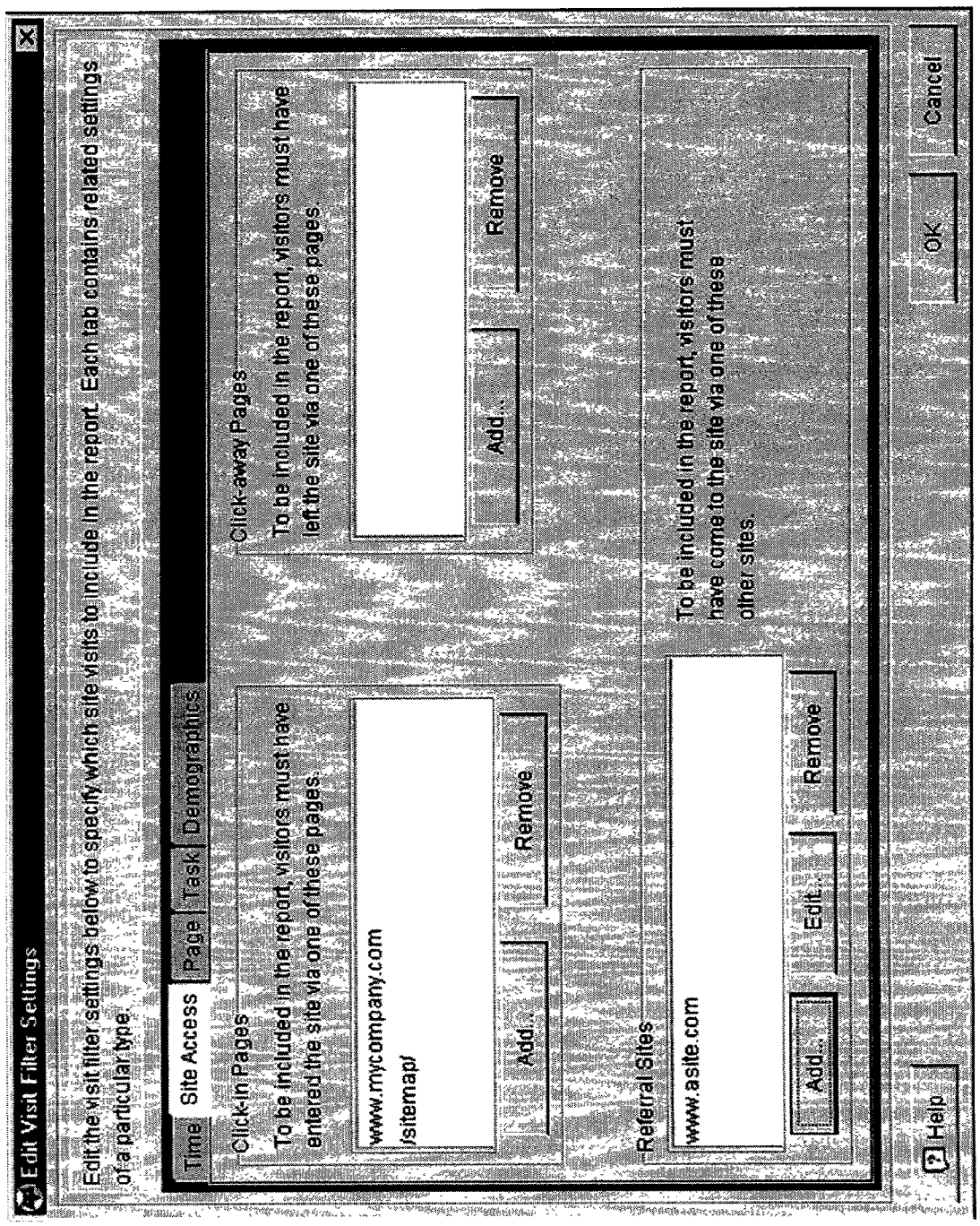
Figure 6:
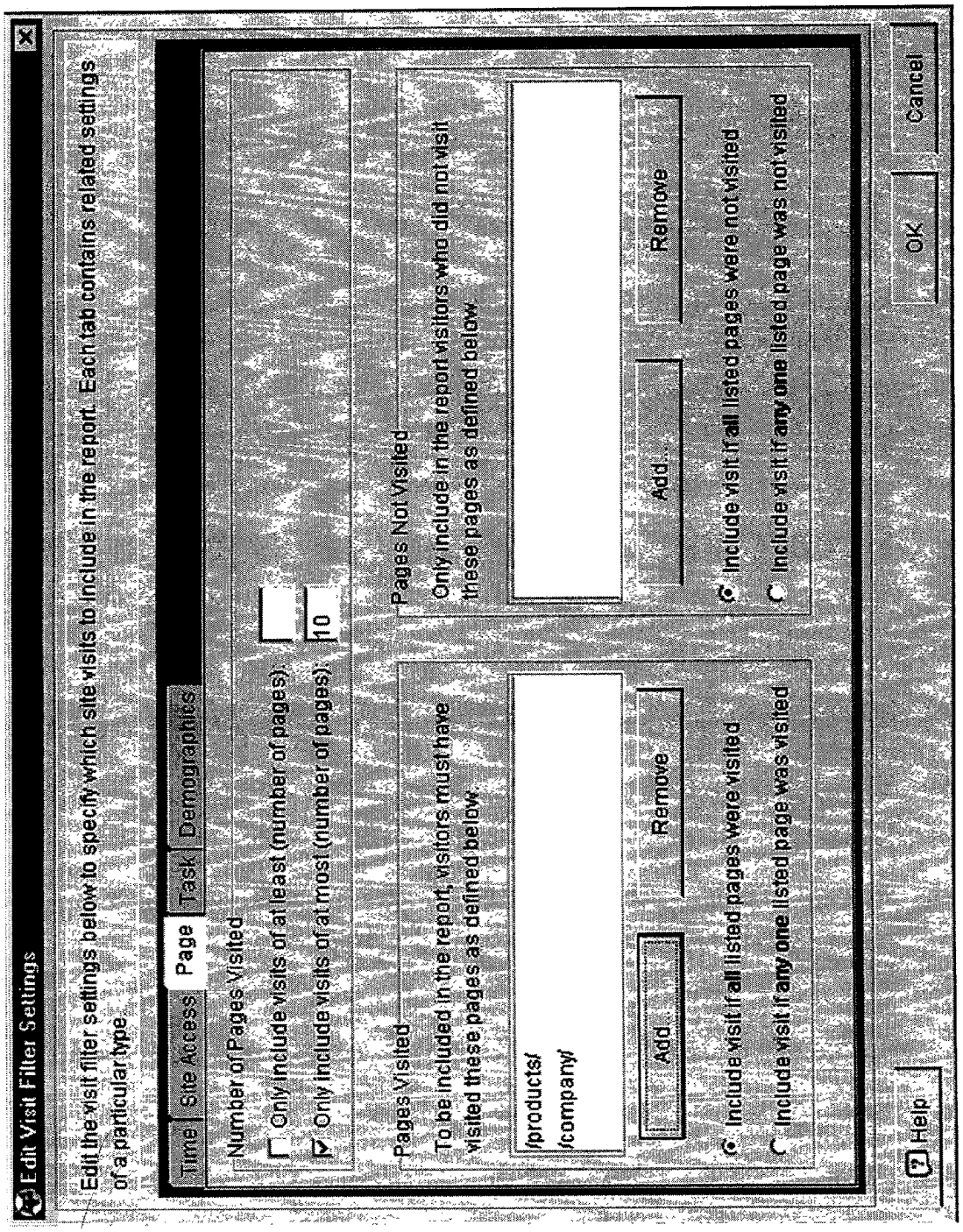

As shown in FIGS. 4, 5, and 6, other examples of queries are ones in which a user requests information on the sequence in which all visitors, or a group of certain defined visitors, visit the web pages within the web site. The query may also seek to determine all the paths that particular visitors take through a web site. A user may also request more specific travel sequences by selecting two web pages within the website and inquiring as to the web pages visited between these two points within a web site and, if desired, what particular pages that a particular group of visitors visited between these two points.

Figure 7:
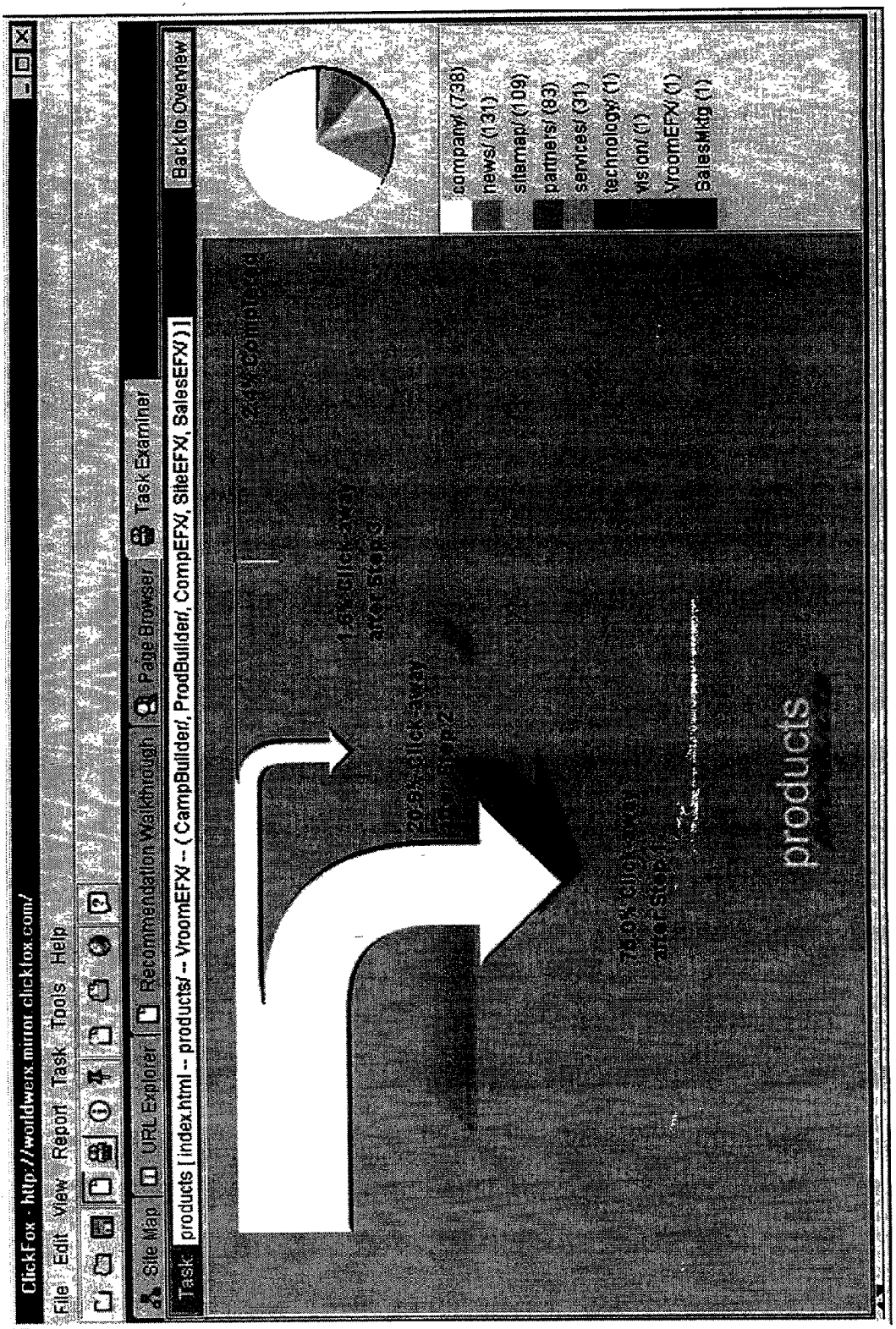
Figure 8:
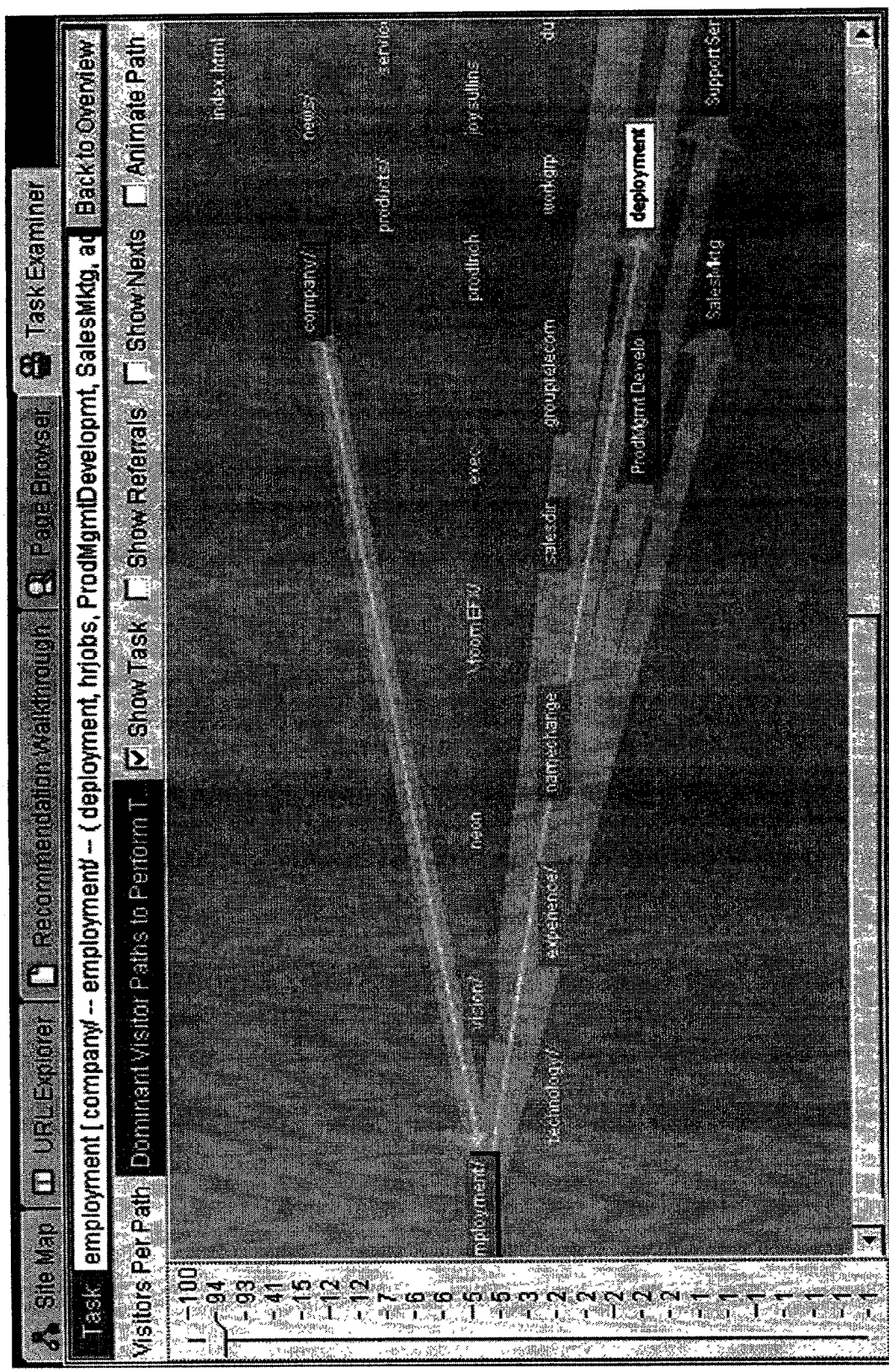

As shown in FIGS. 7 and 8, the queried information may, alternatively, also concern the expected behavior of visitors as determined by a web site analysis program. Such visitor behavior may concern many criteria such as web pages expected to be visited, order of web pages expected to be visited or expected amount of time at particular web pages visited. Such visitor behavior could be further defined to be limited to a particular group of visitors.

Figure 9:
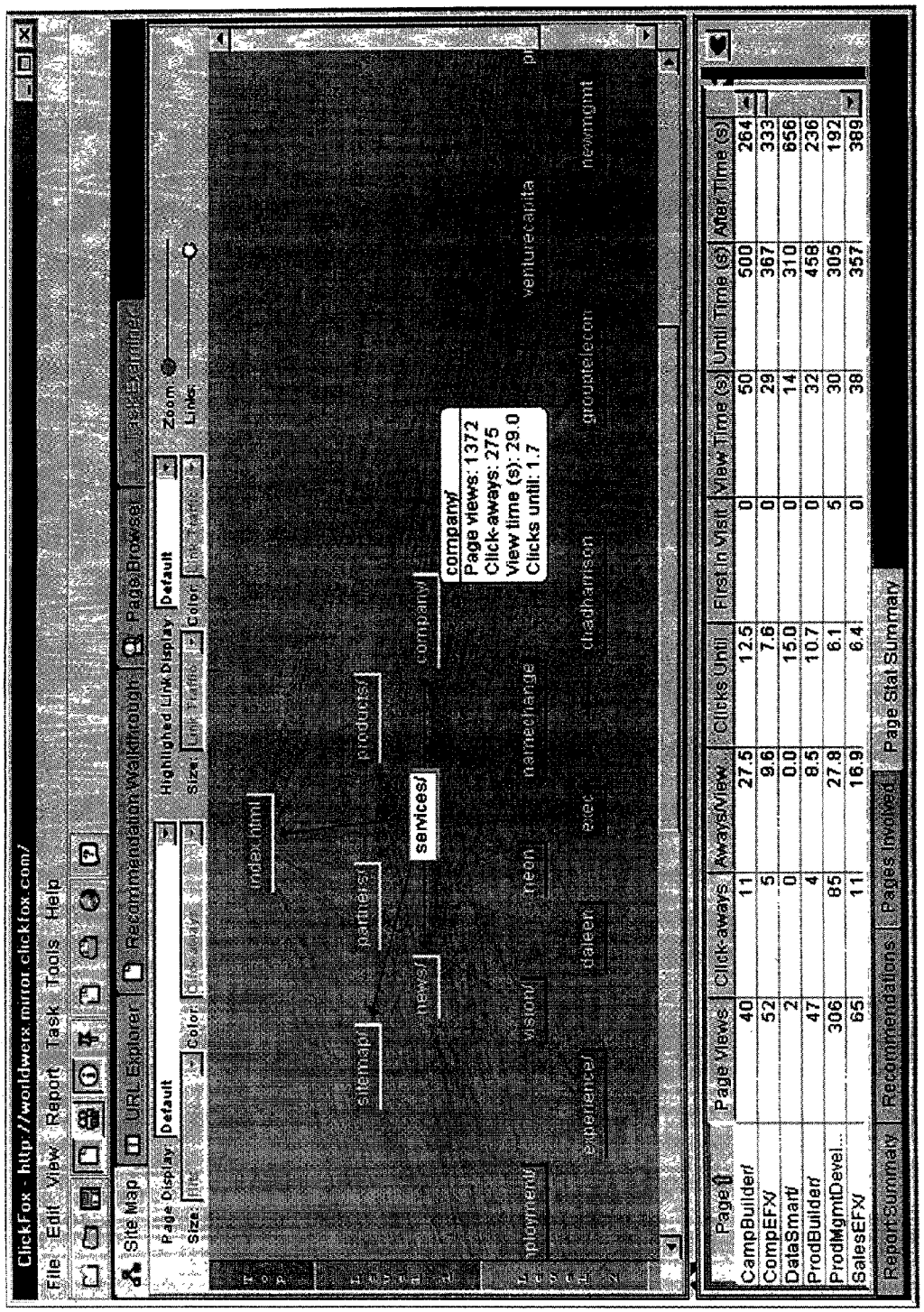

As shown in FIG. 8, the queried information may, alternatively, also concern the most likely, or dominate, sequence of web pages that visitors will visit within the web site as determined by a web site analysis program. Such query may concern the typical web pages visited, typical order of web pages or typical time of visitation. Such dominate behavior could be further defined to be limited to a particular group of visitors As shown in FIG. 9, the queried information could instead simply concern the number of page views within each web page within the web site. More specifically, the queried information could concern showing distinctions between web pages based on the number of times that visitors visit each such page.

Alternatively, as shown in FIG. 5, the queried information may concern how visitors exit a web site and determining the expected manner of exit, the dominate manner of exit or the number of times a visitor exits the web site from a particular web page within the web site. This query might also seek information regarding external web pages to which visitors exit from the web site. Alternatively, this query might seek information regarding external web pages from which visitors enter the web site.

Figure 10:
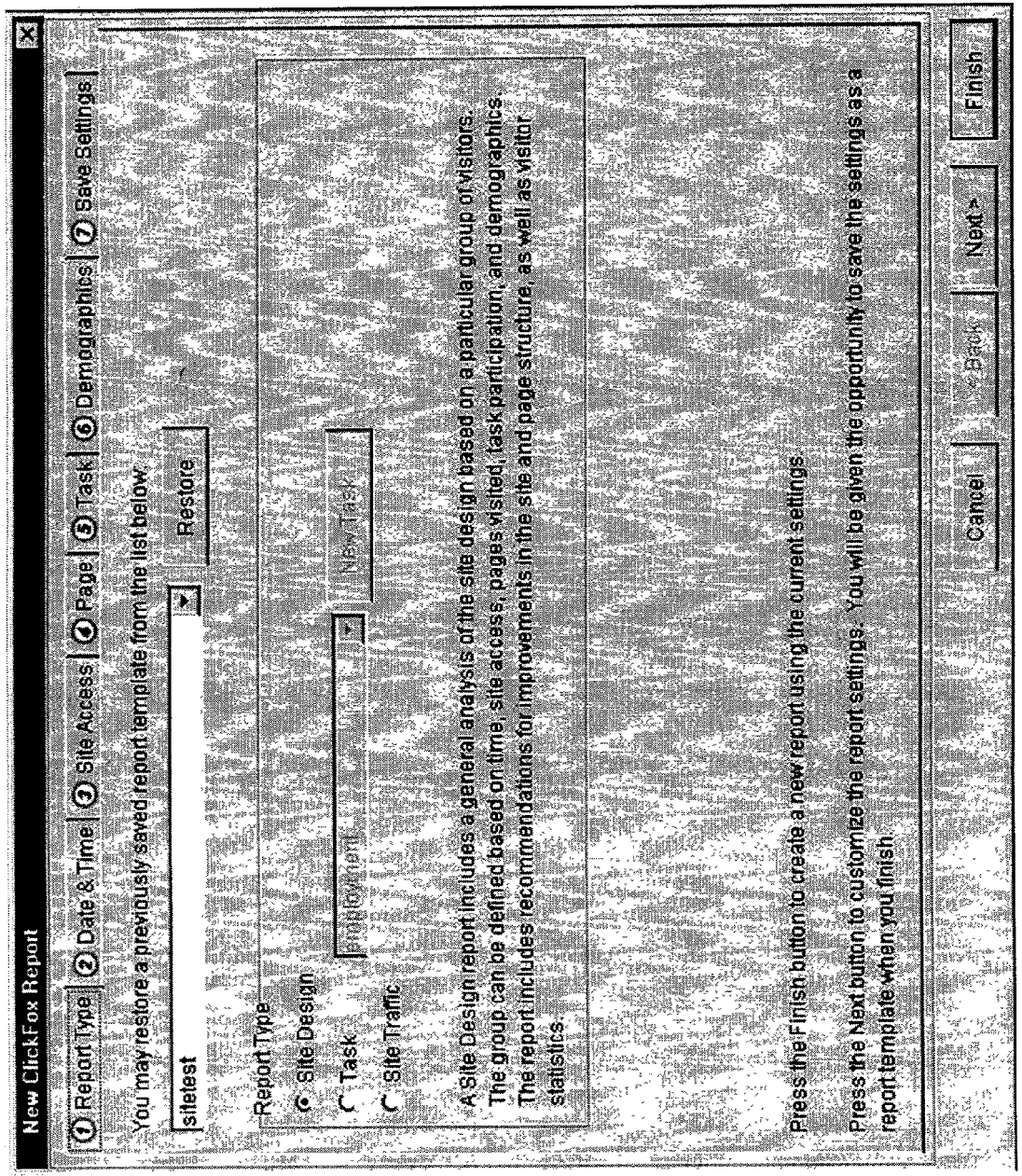

As shown in FIG. 10, the queried information could also be displayed in a report showing multiple displays concerning various queried information. This report may also consist of previously queried information and displays that a user stored or saved for later use. Consequently, the report may be composed of both new and old information regarding web sites and the patterns of utilization thereof.

It should also be understood by the reader that any of these query types can be combined or modified to obtain different types or combinations of different types of information.

As shown in FIG. 3, the queried information may also include limiting the query to web pages within a certain number of steps from a selected web page wherein a step is defined as visiting one web page and then visiting another web page without visiting any intervening web pages. Thus, the query may seek attributes of travel from one selected web page to other web pages. A basic example of such a query would be a request to know all web pages to which a visitor directly visits after a specific web page. Another example would entail determining the web pages that a visitor visits within two web pages of visiting the selected web page.

Figure 11:
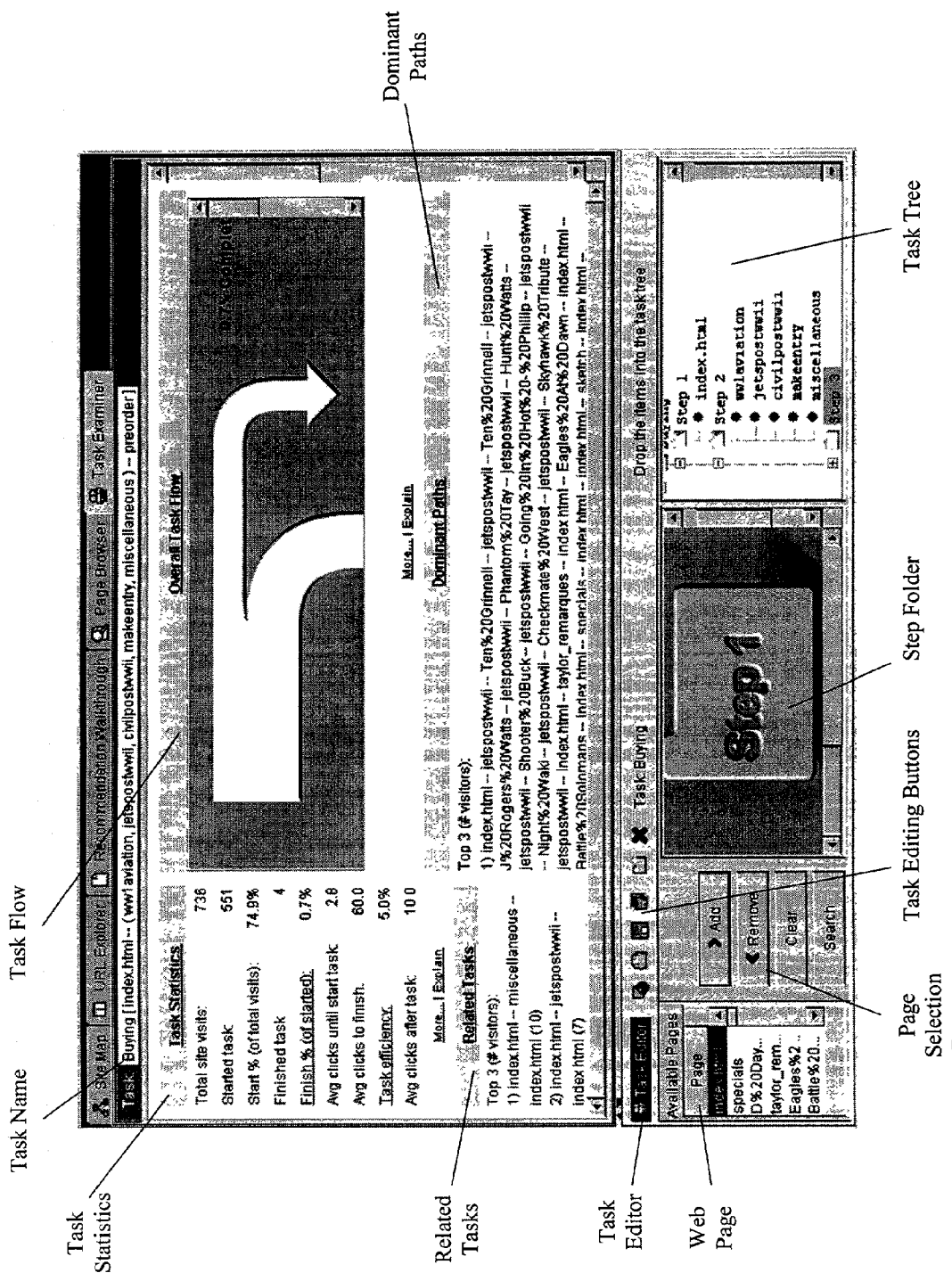

Alternatively, as shown in FIG. 11, the query may include defining the visitation of several web pages in a particular order and requesting the frequency or other attributes of travel of these web pages in the defined particular order. Steps could also be combined so as to inquire as to what manner or how frequently a visitor completes a particular task. For instance, a task could be defined as completing steps one through four. The user could then inquire as to how frequently this task is completed or the typical manner in which the task is or is not completed.

As further shown in FIG. 11, for queried information that involves steps, the query could also involve defining a group of web pages as equivalent for a particular step or, in other words, define that web sites belong to a particular level. Thus, the query could involve requesting information concerning the order that visitors visit particular levels or when those visitors complete a particular task. For example, web pages that display certain goods for sale could each constitute step 1 in a particular task, web pages that solicit additional features to these goods could each constitute step 2 in a particular task, web pages that allow for ordering of the good could each constitute step 3 in a particular task and web pages that allow for payment of the good could each constitute step 4 in a particular task. All web pages that constitute step 1 in a particular task could alternatively be defined as belonging to level 1. The queried information could then involve determining attributes of visitors who do or do not visit defined levels in a particular order.

Figure 12:
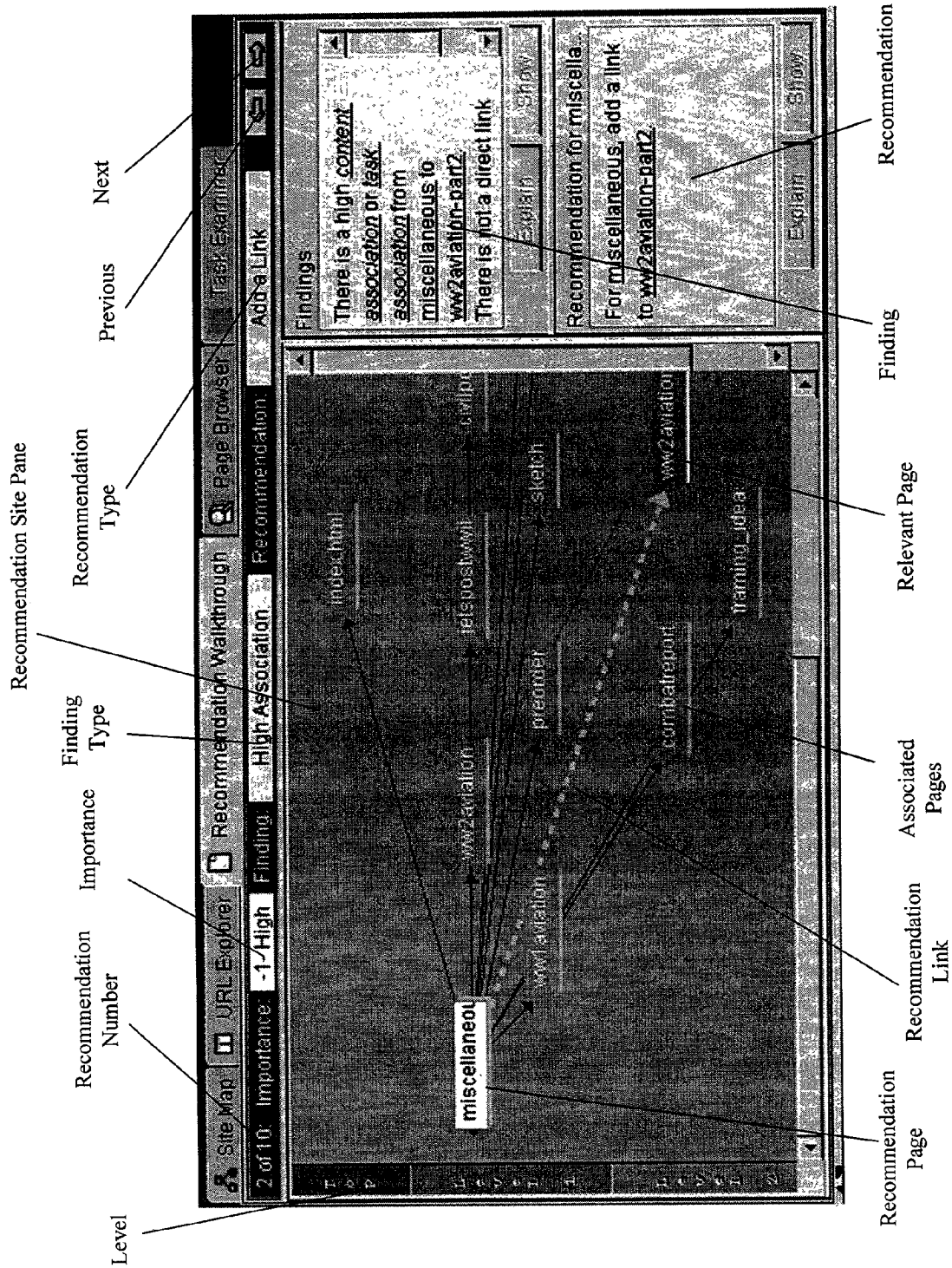

As further shown in FIG. 12, the queried information could also include recommendations received from the web site analysis program of changes to the web site that should be implemented. The queried information could also request that these recommended changes are displayed in a manner distinguishable from other requested information and may include the use of different colors, shapes or lines. The queried information could also consist of only recommended changes to the web site or in conjunction with requests for the display of other queried information. Additionally, a query requesting the display of recommendations of changes to the web site could request that such a display occur in a particular sequence. Conversely, the queried information could be limited to particular recommendations or recommendations regarding only a selected portion of the web site. The queried information could also include that the web site analysis machine determines the particular manner of display depending on the type of recommendation information.

Figure 13:
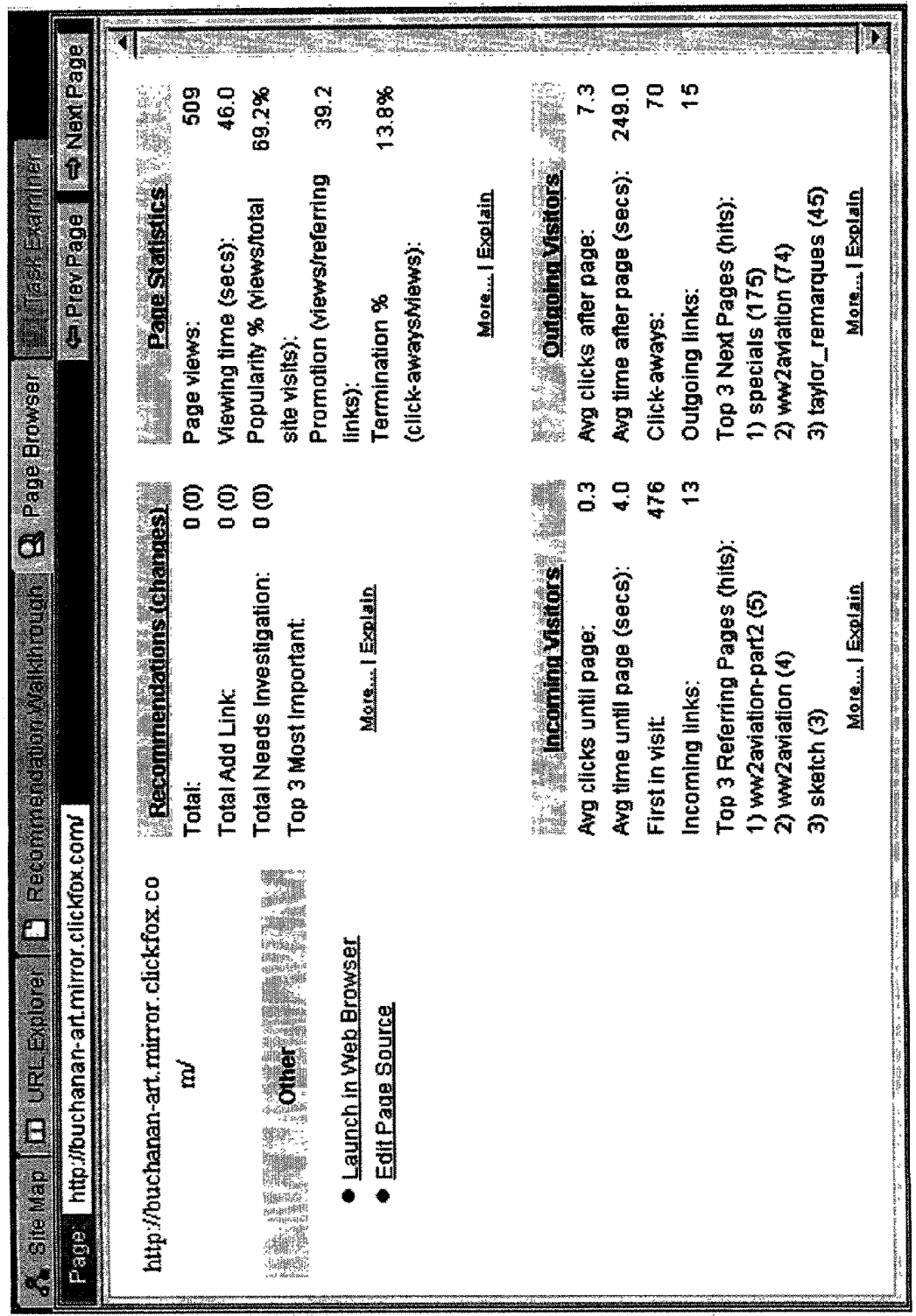

As shown is FIG. 13, the queried information may include a web page's URL or, alternatively, an image of a web page. The queried information may be limited to one particular web page. The queried information may include display of certain web page's HTML code.

Additionally, the User 103 selects from a plurality of graphical interface formats, provided to the User 103 by the UI Controls 104, in which to display the particular utilization. Several different type of graphical interface formats can be provided and the present invention is not limited to any particular plurality of graphical formats. Examples of such formats are provided simply for clarification and do not limit the present invention.

Figure 14:
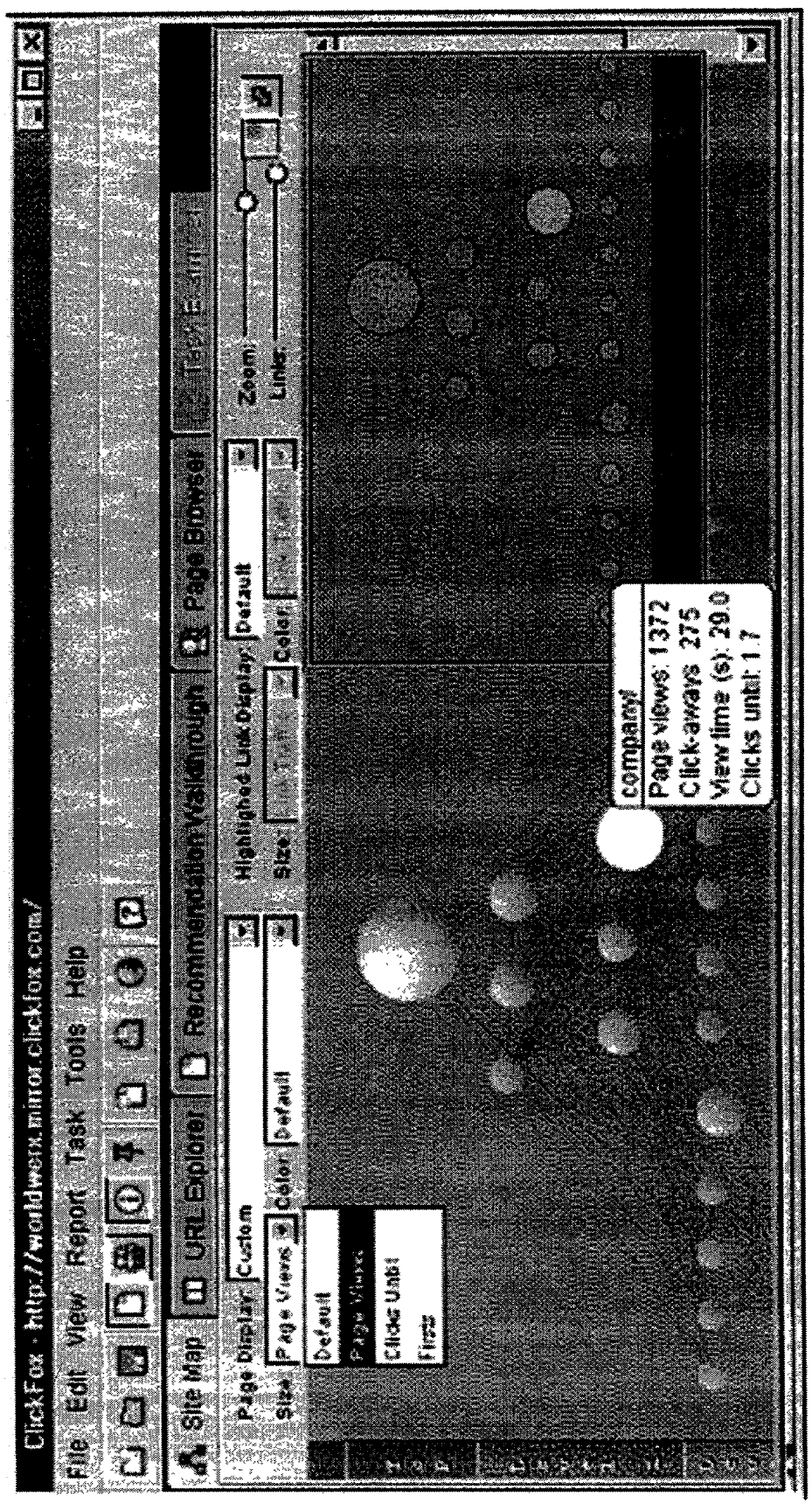
Figure 15:
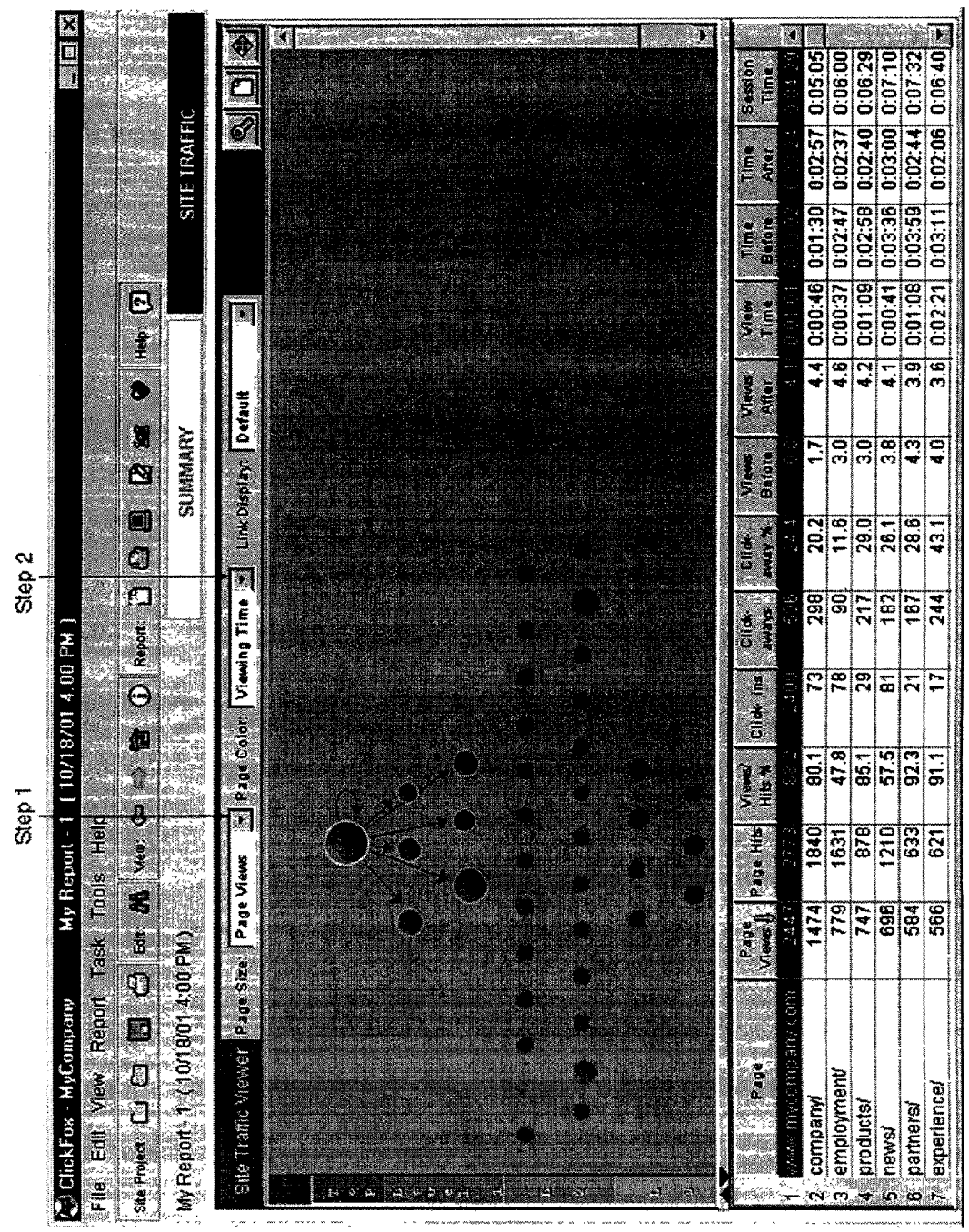
Figure 16:
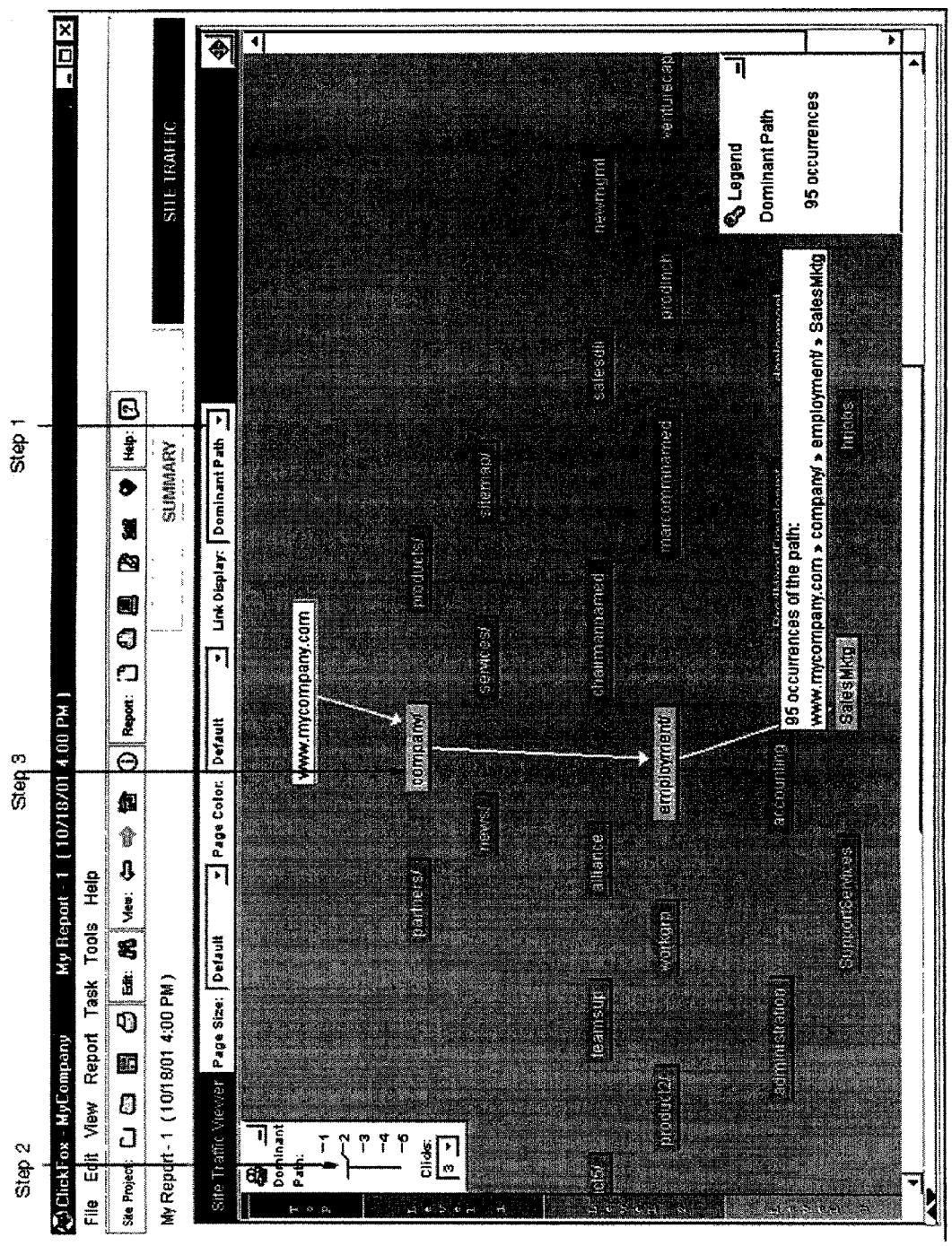

For example, as shown in FIGS. 7, 14 and 15, one such graphical representation is a tree oriented site map representation where each node represents a web page or a resource within the web site and arrows are used to show the relationship between the web pages or, the traversal paths followed by various users accessing the web site. In one embodiment, each web page or resource visited is displayed, and each path from one web page or resource to another is shown by the use of an arrow and divisions within the arrows such that they point to different items of displayed information. In another embodiment of the present invention, the arrows may be displayed using different thicknesses, colors or types. These variations in the arrows can be used to represent statistical information in a clearly communicated manner. For instance, a thick line may represent a path that is utilized by a large number of users and a thin arrow may represent a path that is seldom used. Many other variations are also anticipated by the present invention and the following examples are provided for illustrative purposes and should not be construed as a limitation on the various implementations of the present invention. Rather than arrows, lines may be used, either alone or in conjunction with arrows to show activity or relationships within the web site.

As shown in FIG. 8, different types of lines may be used to represent various types of information. For instance, a solid line may represent the structure of a web site, a dashed line may represent typical traversals used by visitors to the web site, dotted lines may be used to typical "effective traversals" within the web site. An "effective traversal" means traversing from point A to point B within the web site without including the intermediary points that are visited within the web site. The present invention may also utilize graphical display formats consisting of lines, different types of lines to represent one type of information and line colors to represent another type of information. The thickness of the lines can convey details regarding the first type of information and certain color spectrums may be used to convey details regarding the second type of information. Those skilled in the art will realize that any of a variety of alternative methods could also be utilized.

As shown in FIG. 4, another such graphical representation is the use of pie charts. In this graphical representation, each web page, resource or function within the web site may be represented as a piece of the pie chart. The size of the piece of pie can represent various attributes about the web page, resource or function. For instance, the size of the piece of pie may represent the number of hits for a particular web page, resource or function. Alternatively, the size of the piece of pie may represent the number of times that the web site was exited from a particular web page within the web site. Additionally, the size of the piece of pie may represent the number of times that a particular web page was the nth stop during the visitation of the web site.

As shown in FIGS. 12, 14, 15 and 16, another such graphical representation is the use of various shapes to convey information. The possible graphical display formats includes the use of shapes. This aspect of the present invention uses shapes, various types of shapes, various shape sizes, various colors and other distinguishing information of the shape to represent particular information. As an example, web pages, resources and functions within a web site may have a different shape. If a web page is depicted as a sphere, the size of the sphere may be used to encode one attribute of the web page. The larger the sphere, the larger that attribute value is. The color of the sphere (i.e. on a scale of blue to red) may represent another attribute of the web page. As a particular example, the size of the sphere may represent the number of times that a web page is visited. The larger the sphere, the larger the number of hits. The color of the sphere may represent the number of times the web site is exited from the particular web page. Thus, a large red sphere may indicate that a web page is frequently visited as the last page at the web site. A small blue sphere may indicate that a web page is visited infrequently but, when it is visited, the visitors most likely will perform a certain function (i.e., purchase a product or sign up for a service).

As shown in FIG. 11, another such graphical representation of the present invention includes combining text with the various graphical representations. Again, the color, size, font and other attributes of the text can be used to convey statistical information regarding the patterns of utilization of the web site.

Another such graphical representation is for the sequence of a visitor or a particular group of visitors to be indicated by an icon symbolizing the visitor or visitors. Alternatively, the icon representing a visitor or visitors may move between the pages in the requested sequence.

Figure 17:
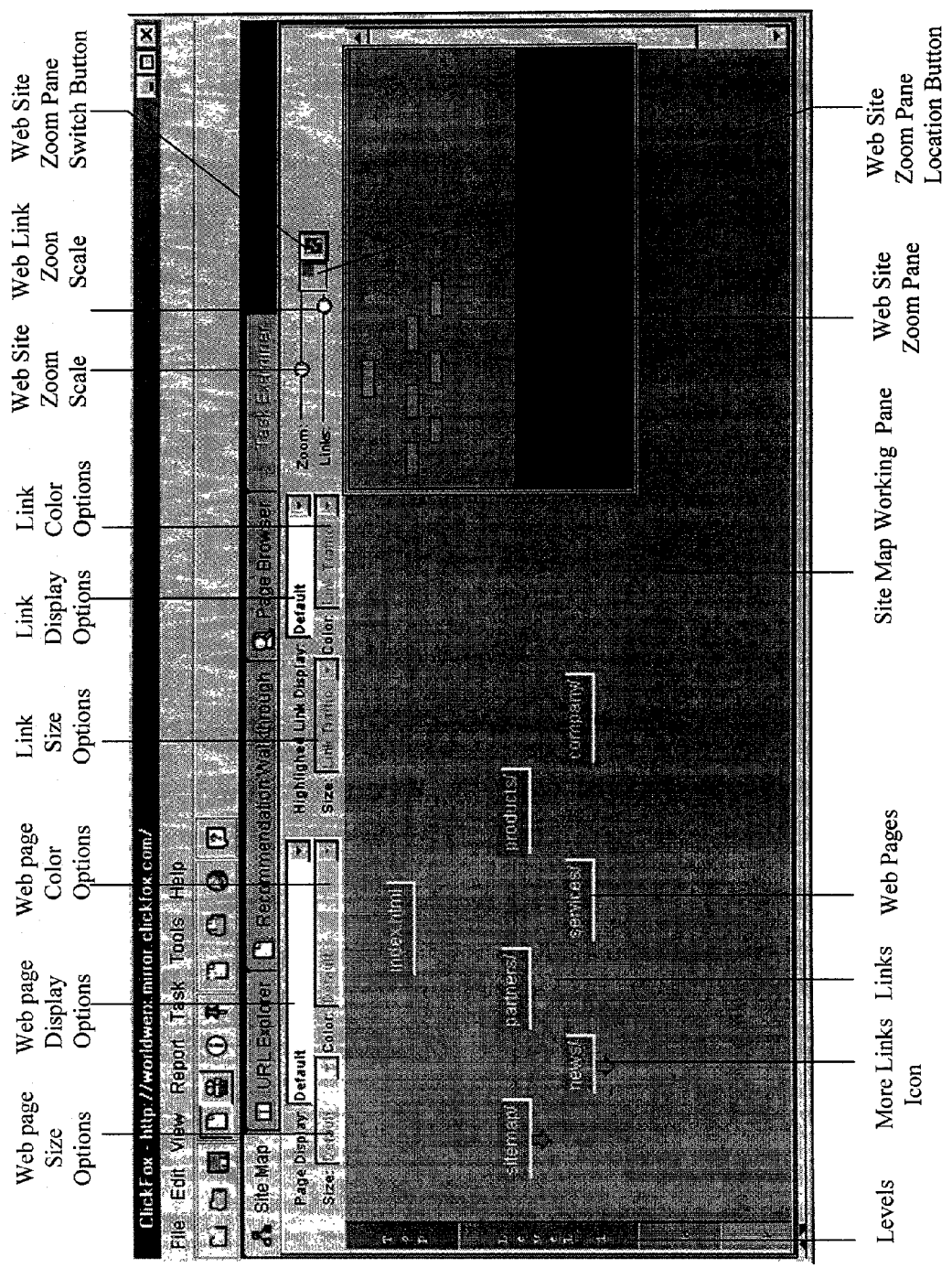

As shown in FIG. 17, another such graphical representation of the present invention is the use of scaling. The web site may be represented by using various shapes, arrows or the like. However, most web sites are too large to be shown in a single screen. The present invention provides a scaled overview of the entire web site within a separate window or inset on the visual display while a larger, more detailed graphical representation of a portion of the web site is displayed. The portion of the web site may be highlighted in the scaled overview window. A user can then pan to various locations within the web site map to view statistical information about that particular portion of the website. The user can also zoom in and out of the scaled view by using a zoom selector. The chosen method of display could also allow scaling of the web site graphical display such that the entire web site may be viewed on one display screen.

As shown in FIG. 14, the method of display may include not displaying the queried information until a user takes a certain action to display it. The certain action for such display may involve moving a cursor over a particular part of the display. The manner of such display may also vary. In one instance the queried information may be shown through the use of a box of textual information that appears when the user takes the certain action.

Thus, those skilled in the art will realize that such graphical representations greatly simplify the communication of statistical information regarding the utilization of a web site.

As shown in FIG. 1, the above described inputs of the User 103 are provided to a Computer Processor ("Processor") 105. The Processor 105 also receives information from a Web Site Analysis Program 100. The Processor 105 then conforms the inputs of the user received from the UI Controls 104 to the information from the Web Site Analysis Program 100 to produce the queried information in the requested graphical format. The conformed information is then sent to the Visual Display 106 and displayed to the user 107.

The User 103 then has the opportunity to select a second graphical format from the plurality of graphical interfaces in which to redisplay the queried information. The UI Controls 104 relays the new input to the Processor 105. The Processor 105 then retrieves other information from a Data Base 109 that stores information regarding the various graphical formats and the Web Site Analysis Program 100 as needed. Upon receipt of all such information, the Processor 105 will update the Visual Display 106 as requested by the User 103.

The Processor 105 may retain the information received from the Web Site Analysis Program 100 in a Data Base 109 so that it does not need to query the Web Site Analysis Program 100 each time it receives a request from the User 103. The Data Base 109 may alternatively be contained with the Web Analysis Program 100.

Figure 2:
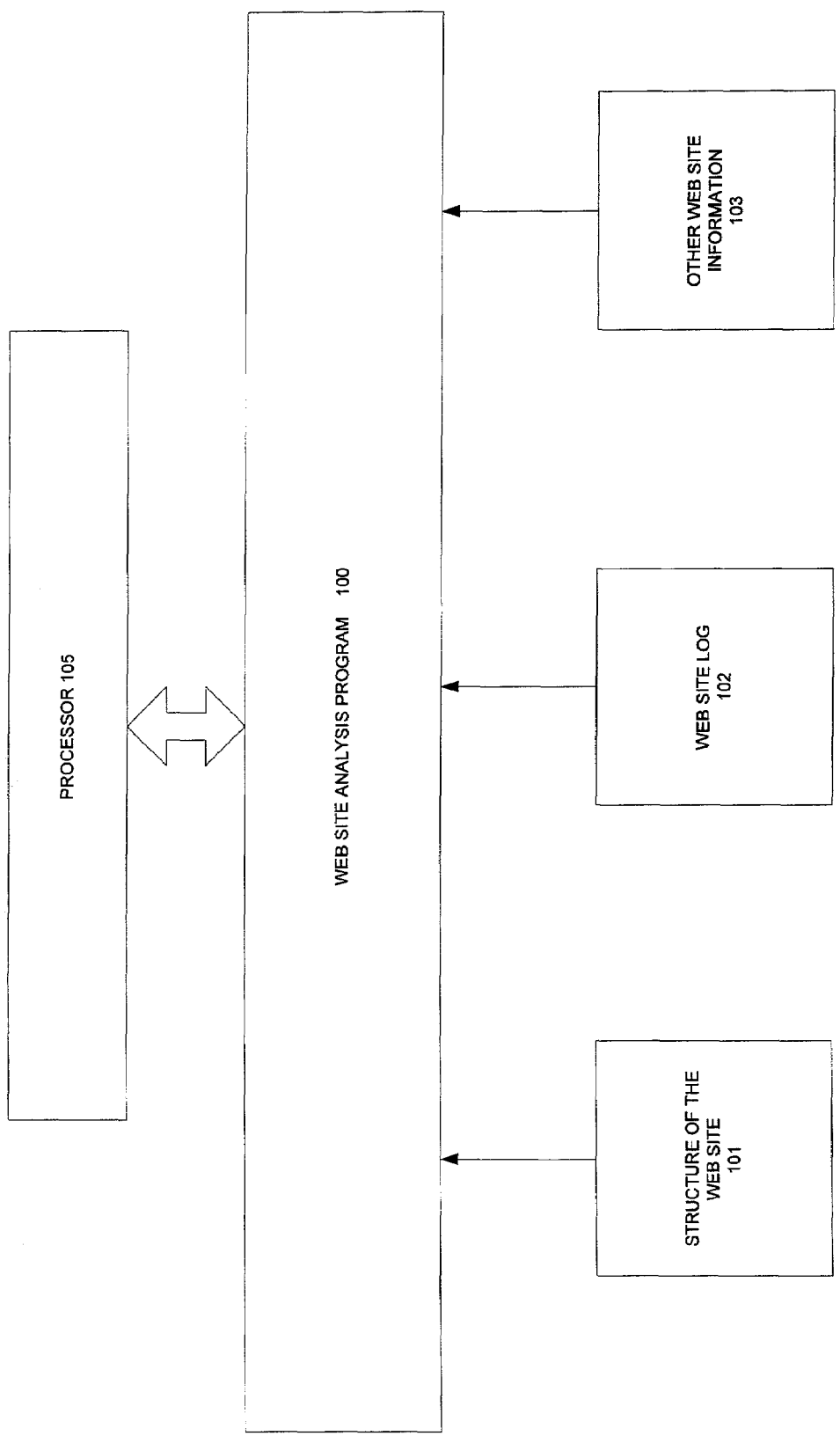
FIG. 2 is a block diagram illustrating the operation of an embodiment of the present invention in evaluating a website.

FIG. 2 is a block diagram illustrating the operation of an embodiment of the present invention in evaluating a website. A Web Site Analysis Program 100 generates generally uncorrelated information. In this embodiment, the Web Site Analysis Program 100 receives information regarding a selected web site from a Web Log 102 and specific information regarding the structure of the selected web site 101. Such specific information regarding the Structure 101 may be supplied through previous user inputs or input of the HTML code used to operate the specific web site. The Web Log 102 may be obtained from any of the places from which one skilled in the art would normally obtain such information regarding a web site. Other information 103 concerning the web site may also be provided via other means such as user defined criteria or other web site processors. Finally, the Web Site Analysis Program 100 may receive information or direction from the Processor 105 within the invention. The Web Site Analysis Program 100 then takes all received information and processes it (depending on its programming and user direction) so as to be able to supply various information regarding the specific web site. This information is then relayed from the Web Site Analysis Program 100 to the Processor 105. If the user requests information that was not initially provided by the system, the system is queried for such information. The system can then provide such information or, if applicable, alter its behavior such that it can obtain such information and deliver it in the future. Additionally, should the data requested by the user not be of the type delivered to the invention, the invention can request the system to perform the appropriate calculations so that the system may obtain the desired information and display it for the user.

For example, the Web Analysis Program 100 may provide a list or log of all visitor sessions to the Processor 105. The visitor sessions may include information regarding how many people visited each web page within a web site and the order in which each of the web pages were visited. The Web Analysis Program 100 of course may provide any other information that may be obtained or extrapolated regarding a specific web site. Examples of such information include logs or scripts regarding the access and operation of the web site and even the actual structure of the particular web site including what pages are present in the web site and the linking relationships between these pages. The type of information displayed and the manner in which the information is displayed can vary in most any manner that the user may request.

As one skilled in the art will recognize the invention presents patterns by receiving input from a user as to the information to be reviewed and the format in which to present the information. The inputs from a user may be received by the invention through any means that allows for user input. The various user inputs are supplied to a processor within the invention. The system also relays information concerning itself to the processor within the invention. The processor then supplies a display device with instructions on how to graphically display the information from the system based on the input of a user. The display then shows the requested information in a graphical means to a user. The user can then modify his or her input after viewing the shown information. The processor within the invention then receives this modified input and, along with the information previous supplied by the system, alters the display to show the requested information in the new manner selected.

The presentation and various aspects, advantages and operations of the present invention have been described through the use of several examples. It should be understood that the presentation is not limited to those specific examples but rather, the presentation is also applicable in many other situations. The present invention may be implemented in software running on a computer system, in hardware, or in a combination of both. Alternate embodiments of the present invention may be apparent to those skilled in the art to which the present invention pertains without departing from its spirit and scope. Accordingly, the present invention is described by the appended claims and the foregoing description.

What is claimed is:

1. A computer-implemented method for displaying patterns of utilization of a resource, wherein said resource includes a plurality of objects of interest, and wherein the plurality of objects of interest are linked by a navigation structure, the method comprising the steps of:
   accessing structural data regarding the navigation structure of the objects of interest in a resource, wherein said resource is a web-site;
   defining a task as a predetermined sequence of accesses to one or more objects of interest of said plurality of objects of interest, wherein an object of interest is a web-page;
   accessing session data representative of one or more sessions of user interaction with the resource where a session identifies a sequence of user accesses to one or more of said plurality of objects of interest, wherein at least one of the user accesses is to an object of interest that is not in the task sequence;
   graphically displaying a hierarchical representation of objects of interest and their navigation structure, overlaid with a representation of the paths taken in the user accesses to perform the task.

2. The computer-implemented method of claim 1, wherein the step of defining a task as a predetermined sequence of accesses to one or more objects of interest, comprises:
   defining a task step as an access to one or more objects of interest; and
   defining a task as a predetermined sequence of task steps.

3. The computer-implemented method of claim 2, wherein the overlaid representation of the paths taken shows the number of users that completed each step of the task.

4. The computer-implemented method of claim 2, further comprising the step of:
   providing a graphical user interface for implementing the step of defining a task as a predetermined sequence of accesses to one or more objects of interest.

5. The computer-implemented method of claim 4, wherein said graphical user interface enables a user to drag and drop objects of interest into a graphical representation of the task sequence.

6. The computer-implemented method of claim 4, wherein said graphical user interface enables objects of interest in a task sequence to be defined using a table-based list selection interface.

7. The computer-implemented method of claim 2, wherein the overlaid representation of the paths taken in the user accesses is a user path for one or more users.

8. The computer-implemented method of claim 2, wherein the overlaid representation of the paths taken in the user accesses is an average path for a plurality of users through the task steps in the task sequence.

9. A computer-implemented method for displaying patterns of utilization of a resource, wherein said resource includes a plurality of objects of interest, and wherein the plurality of objects of interest are linked by a navigation structure, the method comprising the steps of:
   accessing structural data regarding the navigation structure of the objects of interest in a resource, wherein said resource is a web-site;
   defining a task sequence as a predetermined sequence of accesses to one or more objects of interest of said plurality of objects of interest, wherein an object of interest is a web-page;
   accessing session data representative of one or more sessions of user interaction with the resource where a session identifies a sequence of user accesses to said one or more of said plurality of objects of interest, wherein at least one of the user accesses is to an object of interest that is not in the task sequence;
   filtering the data representative of one or more sequences of user accesses to include only a set of sessions based on a filter criteria by comparing the task sequence to the data representative of one or more sequences of user accesses; and
   graphically displaying a hierarchical representation of objects of interest and their navigation structure, overlaid with a representation of the filtered session usage data.

10. The computer-implemented method of claim 9, wherein the filter criteria identifies sessions for users that spent at least a particular amount of time on any one object of interest.

11. The computer-implemented method of claim 9, wherein the filter criteria identifies sessions for users that spend at most a particular amount of time on each of the objects of interest in a session.

12. The computer-implemented method of claim 9, wherein the filter criteria identifies sessions for users that started the session at a particular entry object of interest.

13. The computer-implemented method of claim 9, wherein the filter criteria identifies sessions for users that ended the session at a particular entry object of interest.

14. The computer-implemented method of claim 9, wherein the filter criteria identifies sessions for users that came to the resource from a particular referring resource.

15. The computer-implemented method of claim 9, wherein the filter criteria identifies sessions that had a minimum number of user accesses.

16. The computer-implemented method of claim 9, wherein the filter criteria identifies sessions that had a maximum number of user accesses.

17. The computer-implemented method of claim 9, wherein the filter criteria identifies sessions that included user accesses to a set of one or more particular objects of interest.

18. The computer-implemented method of claim 9, wherein the filter criteria identifies sessions that included no user accesses to a set of one or more particular objects of interest.

19. The computer-implemented method of claim 9, wherein the filter criteria identifies sessions for users that had only one session using the resource in a given period of time.

20. The computer-implemented method of claim 9, wherein the filter criteria identifies sessions for users that had more than one session using the resource in a given period of time.

21. The computer-implemented method of claim 9, wherein the filter criteria identifies sessions for users that originate from a particular geographic region.

22. The computer-implemented method of claim 9, wherein the filter criteria identifies sessions for users that interacted with the web site using and particular web browser type.

23. The computer-implemented method of claim 9, wherein the filter criteria identifies sessions that included a specific sequence of user accesses.

24. The computer-implemented method of claim 9, wherein the step of graphical displaying a hierarchical representation of objects of interest and their navigation structure, overlaid with a representation of the filtered session usage data sizes the objects of interest based on a parameter of the usage of each object.

25. The computer-implemented method of claim 24, wherein the parameter of usage is representative of the number of users that accessed the objects of interest.

26. The computer-implemented method of claim 24, wherein the parameter of usage is representative of the percentage of users that accessed the objects of interest.

27. The computer-implemented method of claim 9, wherein the step of graphical displaying a hierarchical representation of objects of interest and their navigation structure, overlaid with a representation of the filtered session usage data colors and sizes the links between the objects of interest based on the amount of usage of each link between two objects.

28. The computer-implemented method of claim 9, wherein the step of graphical displaying a hierarchical representation of objects of interest and their navigation structure, overlaid with a representation of the filtered session usage data shows the links between objects of interest based on the amount of usage of each link in a path between two objects.

* * * * *